No. 880,061. PATENTED FEB. 25, 1908.
A. S. ANDERSON.
AUTOMATIC THROTTLE OPERATOR.
APPLICATION FILED JULY 20, 1907.
2 SHEETS—SHEET 1.
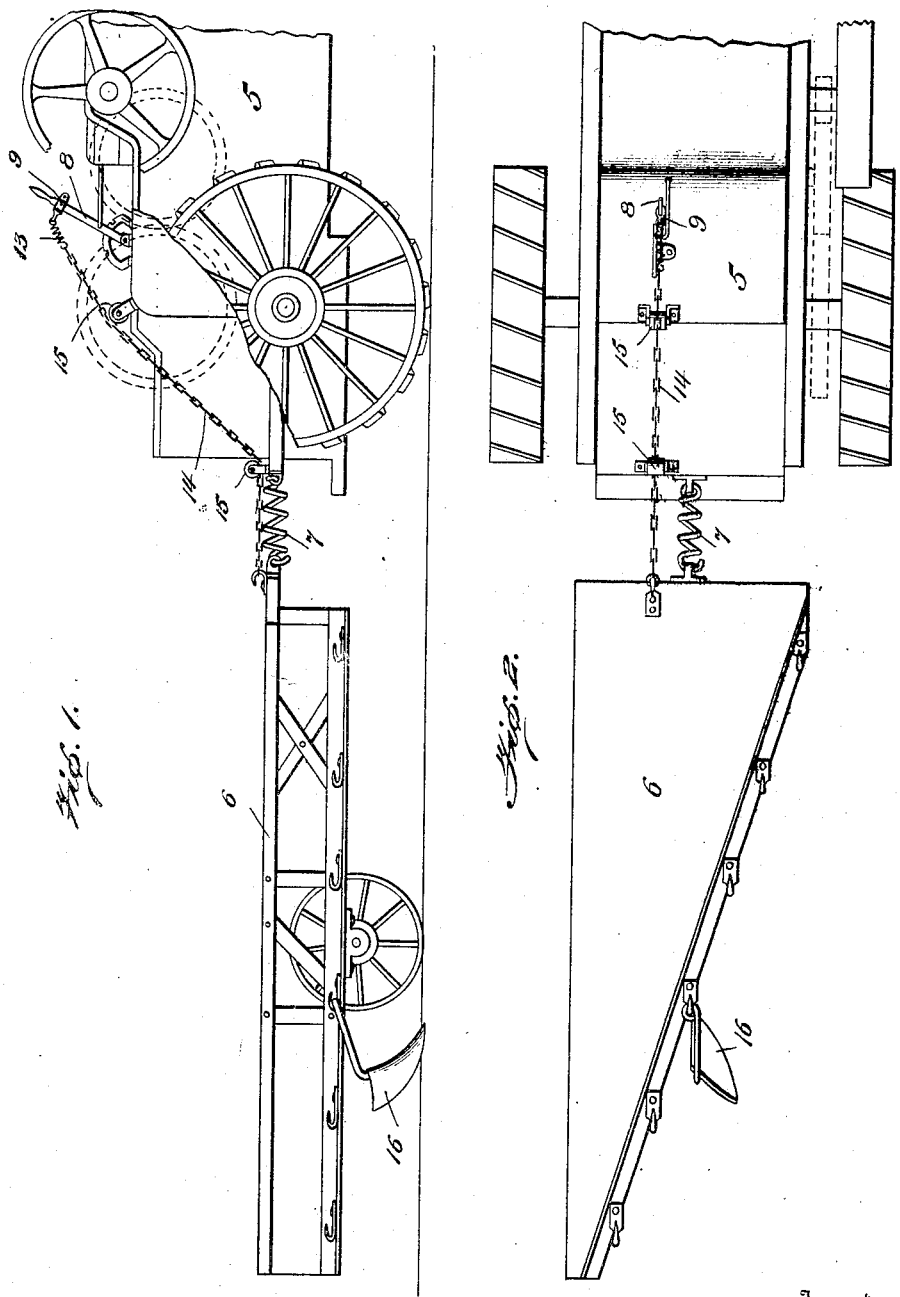
Witnesses
Inventor
A. S. Anderson,
By Woodward & Chandlee
Attorneys No. 880,061. PATENTED FEB. 25, 1908.
A. S. ANDERSON.
AUTOMATIC THROTTLE OPERATOR.
APPLICATION FILED JULY 20, 1907.
2 SHEETS—SHEET 2.
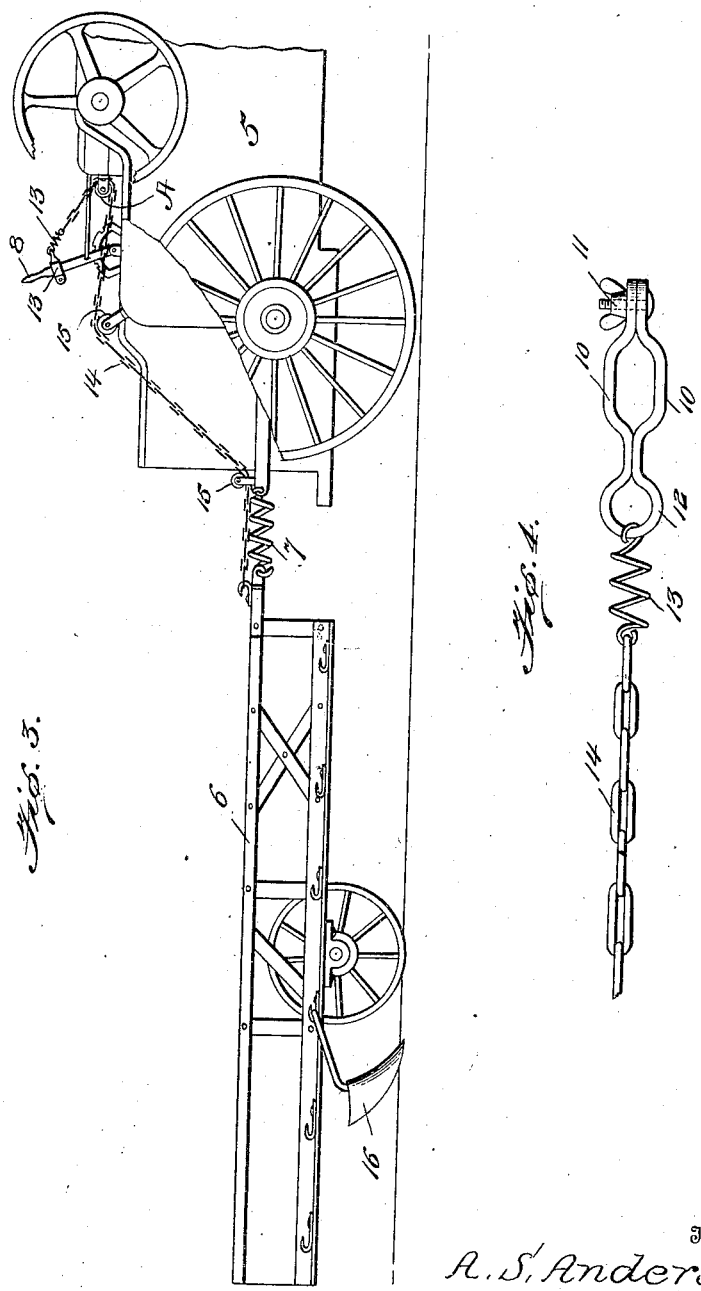
Witnesses
Inventor
A. S. Anderson,
By Woodward & Chandlee
Attorneys

UNITED STATES PATENT OFFICE.

ANDREW S. ANDERSON, OF NAUGHTON, NORTH DAKOTA.

AUTOMATIC THROTTLE-OPERATOR.

No. 880,061.     Specification of Letters Patent.     Patented Feb. 25, 1908.

Application filed July 20, 1907. Serial No. 384,728.

*To all whom it may concern:*

Be it known that I, ANDREW S. ANDERSON, citizen of the United States, residing at Naughton, in the county of Burleigh and State of North Dakota, have invented certain new and useful Improvements in Automatic Throttle-Operators, of which the following is a specification.

This invention relates to traction engines and more particularly to throttle operating attachments therefor, and has for its object to provide a throttle operator for use in connection with traction engines when attached to plows or other farm implements likely to meet obstructions in their paths which would tend to either break the implements themselves, or disconnect them from the engine, the arrangement of the present attachment being such that it is operated to close the throttle before injury to the implement or its connections occurs.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is an elevational view of a portion of a traction engine and a plow rigging, the arrangement of the present invention being shown; Fig. 2 is a top plan; Fig. 3 is a view similar to Fig. 1 showing the artachment arranged for use in connection with an oppositely operable throttle. Fig. 4 is an enlarged view showing the connection of the chain with the throttle lever.

Referring now to the drawings, there is shown a traction engine 5 with its plow rigging 6, which is connected to the engine by means of an extensible spring 7.

The throttle lever of the engine is indicated at 8 and engaged with this lever, there is a collar 9 including jaws 10 which are connected at one side of the lever by means of a thumb bolt 11, so that the collar is adjustable upon the lever. An eye 12 is carried by the collar and has engaged therein, one end of a helical spring 13, which is connected at its opposite end with a flexible connection 14, which is shown in the drawings as a chain. The chain 14 is supported upon suitable pulleys 15 and is secured to the rigging 6 so that rearward movement of the rigging causes a pull upon the chain with consequent movement of the lever 8 to close the throttle. It will thus be seen that engagement of an obstruction by one of the plows 16 or by the rigging 6 itself which would impede the progress thereof would cause an extension of the spring 7 with movement of the chain to stop the engine 5. Should the arresting of the rigging 6 take place on a down grade, under such conditions that the engine 5 could not be readily stopped, it will be seen that the spring 13 would expand and finally break to prevent bending of the lever 8.

In Fig. 4, the attachment is shown in connection with a throttle arranged for forward movement of the lever 6 to close the throttle. In this case, the chain 14 extends forwardly and around a pulley A, and thence to the rigging 6.

What is claimed is:

1. The combination with a draft engine having a controlling lever, of an implement to be drawn, extensible connections between said implement and the engine and connections between said implement and the controlling lever for operation of the latter when the implement and engine are moved away from each other.

2. The combination with a draft engine having a controlling apparatus, of an implement to be drawn, extensible connections between said implement and the engine, operative connections between said implement and the controlling apparatus, said last named connections including extensible portions.

3. The combination with a draft engine having a controlling lever, of an implement to be drawn, a connecting spring between said implement and the engine and a connecting member between said lever and the implement for movement of the lever when the implement and the engine are moved one away from the other, said connecting member being arranged for adjustment longitudinally of the lever.

In testimony whereof he affixes his signature, in presence of two witnesses.

ANDREW S. ANDERSON.

Witnesses:
    M. H. STEVENS,
    R. N. STEVENS.